May 21, 1935.  S. McC. TERWILLIGER ET AL  2,002,022
DIRECTION SIGNAL
Filed Aug. 1, 1928  2 Sheets-Sheet 1
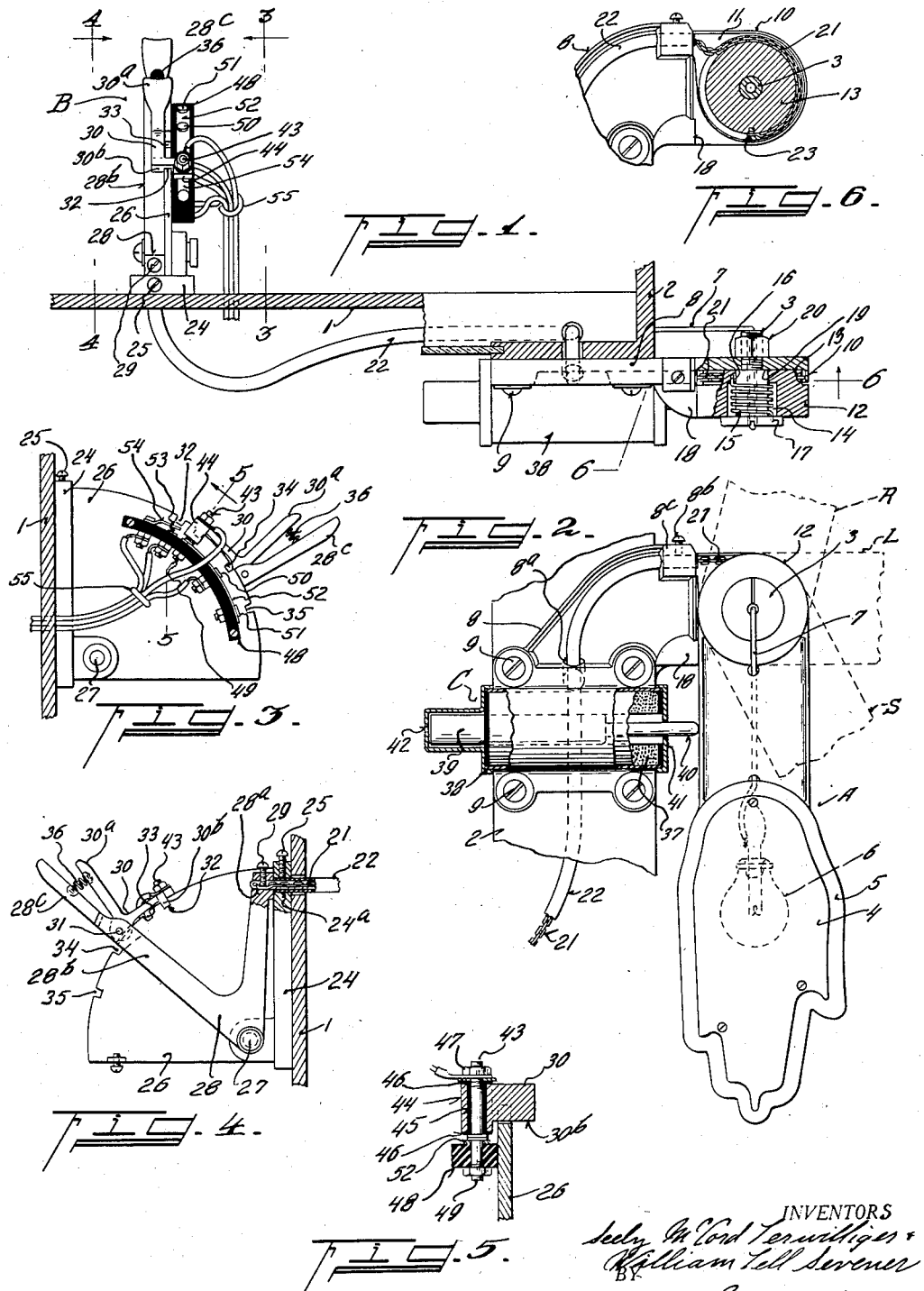
INVENTORS
Seely McCord Terwilliger &
William Tell Sevener
BY
Clarence B. Foster ATTORNEY May 21, 1935. S. McC. TERWILLIGER ET AL 2,002,022
DIRECTION SIGNAL
Filed Aug. 1, 1928 2 Sheets-Sheet 2
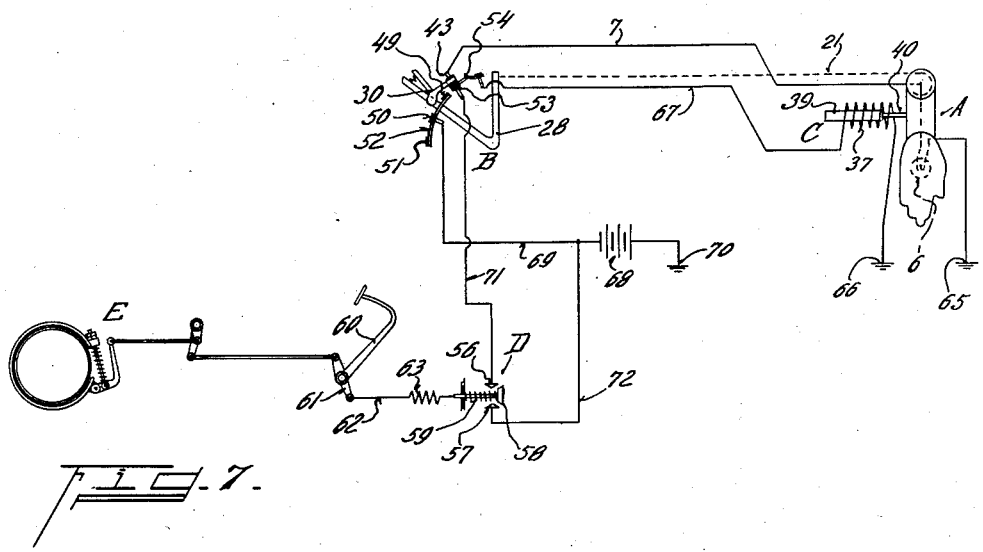
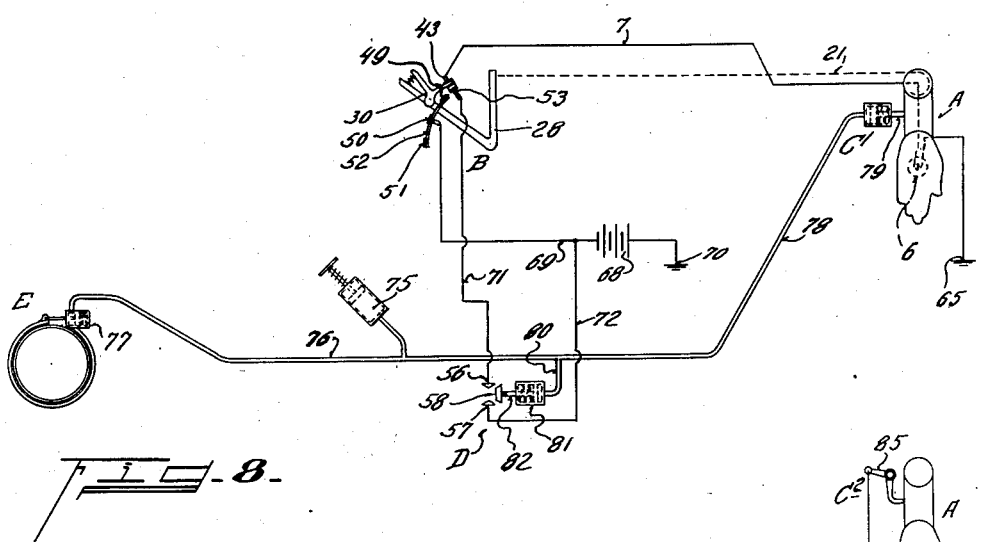
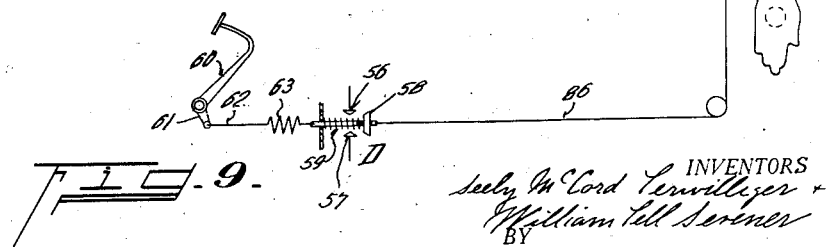
INVENTORS
Seely McCord Terwilliger +
William Tell Seriner
BY
Clarence B. Foster ATTORNEY Patented May 21, 1935

2,002,022

UNITED STATES PATENT OFFICE 2,002,022

DIRECTION SIGNAL

Seely McCord Terwilliger and William Tell Sevener, Los Angeles, Calif., assignors of one-fourth to Clarence B. Foster, Glendale, Calif.

Application August 1, 1928, Serial No. 296,741

8 Claims. (Cl. 177—337)

In the provision of mechanism for operating a signal apparatus of this general character it is desirable to provide a manual means for moving the signal member to the different directional signaling positions prior to the actual turning of the vehicle and to so arrange the signal lamp control that said lamp will not be energized during the movements of the signal arm, that is, it is preferable that the signal arm be illuminated only when at rest in one of its signaling positions.

It is further desirable to provide a second signal arm operating means associated with the brake mechanism of the vehicle, whereby the signal arm will be automatically moved to stop position and illuminated upon application of the brakes, and to arrange such automatic operating means so as not to interfere with or restrict a manual setting of the signal arm to directional signaling positions.

Therefore, it is an object of the present invention to provide a signal apparatus including manual means operable to move a signal member from a non-indicating position to various selective signaling positions and a second operating means associated with the brake mechanism of a vehicle and operable to move said signal member from said non-indicating position to a stop indicating position upon application of the brakes.

Another object is to provide an apparatus of the above character in which the second operating means is an automatically functioning power means energized by application of the brake mechanism.

Another object is to arrange said second operating means so as not to prevent or restrict a manual setting of the signal member while the brakes are applied.

A further object is to provide a signal apparatus including an illuminable signal member and manual means for moving said member from a non-indicating position to various selective signaling positions; to provide means for causing illumination of said member when in a signaling position; to provide a second operating means associated with the brake mechanism of a vehicle and operable to move said signal member to a stop indicating position when the brakes are applied; and to provide means for causing illumination of said signal member when moved to the stop indicating position by said second operating means.

Another object is to provide a signal apparatus of the above character in which the second operating means comprises an electrically energized power device including a power circuit controlled by the brake mechanism.

Various other objects and advantages will be more fully apparent from the following description of the accompanying drawings which form a part of this disclosure and which illustrates a preferred form of embodiment of the invention.

Of the drawings:

Fig. 1 is a plan section through a portion of the windshield and instrument-board of a motor vehicle, showing the signal device of the present invention associated therewith, a portion of the signal arm being shown in section.

Fig. 2 is a front elevation showing the signal arm in normal non-indicating position, certain portions of the device being shown in section.

Fig. 3 is a section taken on the line 3—3 of Fig. 1, with the mechanism in position to set the signal in stop signaling position.

Fig. 4 is a section taken on the line 4—4 of Fig. 1.

Fig. 5 is an enlarged detail section taken on the line 5—5 of Fig. 3.

Fig. 6 is a detailed elevation, partly in section, of the hub portion of the signal arm and of adjacent parts, taken on the line 6—6 of Fig. 2.

Fig. 7 is a semi-diagrammatic view illustrating the electric circuit and connections employed in an installation of the present invention in connection with a vehicle having an ordinary type of mechanical brake.

Fig. 8 is a similar semi-diagrammatic view illustrating the electric circuit and connections in an installation of the present invention in connection with a vehicle having a fluid or air brake.

Fig. 9 is another semi-diagrammatic view illustrating a further modification.

The signal device illustrated in the drawings, includes a signal arm A which is rotatably journaled on the outer end of a supporting bracket preferably secured to the windshield frame 2 of a motor vehicle, a suitable manually manipulated operating device B preferably secured to the instrument-board in a location convenient for operation by the driver, and a second operating means C fixed in a position adjacent the signal arm and arranged to move said arm from normal to stop indicating position.

The particular construction of the signal portion of the signal arm is preferably of the character disclosed in our United States Letters Patent No. 1,647,380 issued November 1, 1927, to which reference may be had for a more detailed disclosure. It is to be understood, however, that the present invention is not restricted in any manner to the particular type of signal arm herein shown, as it is quite evident that various other types of illuminable signal arms may be associated with the signal apparatus, herein described and claimed.

In general, the signal member herein disclosed consists of a semaphore arm journaled upon a pivot bolt 3 and having its outer hollow portion formed in simulation of a human hand and provided at each side with a cover plate 4 similar in contour to the hand portion of the arm and spaced from the outer periphery thereof to provide a marginal light emitting aperture 5, the body portion of the hand behind said aperture 5 being formed to reflect the light rays from the illuminating lamp 6 through said marginal aperture, to thus produce a signal element illuminated in outline by indirect illumination, with said outline contoured in simulation of a human hand. One terminal of the lamp 6 is preferably grounded and the other terminal thereof is connected to a circuit wire 7 which leads to the pivotal center of the signal arm and passes through a bore in the pivot bolt 3 and then extends into the interior of the vehicle for connection with the control mechanism, as will later be explained.

The supporting bracket 8 is secured to the vehicle by bolts 9 or other suitable means and its outer end is provided with an aperture to receive the pivot bolt 3 and is also provided with a forwardly projecting rim 10 defining a pulley chamber 11. The signal arm is provided with a hub portion 12 and a grooved pulley 13 which projects rearwardly from said hub portion and is positioned within said pulley chamber, and said hub portion is provided with a central bolt receiving bore, the forward portion of which is enlarged to form a spring chamber 14. A coil spring 15 surrounds the pivot bolt 3 within the spring chamber 14 and has one of its ends secured to the signal arm as at 16 and its other end secured to the stationary pivot bolt 3, as at 17, the tension of said spring tending to return the signal arm to normal position in contact with a fixed stop 18 formed on the bracket 8. As shown in Fig. 1, the pivot bolt is shouldered as at 19 and is clamped to the bracket 8 by a nut 20 engaging its outer screw-threaded end, the head of said bolt maintaining the signal arm rotatably in place upon the bracket.

The manually manipulated operating device B is adapted to move the signal arm A to its different signaling positions by means of a flexible member, such as a link chain 21, which extends through a conduit guide 22, the outer end portion of said chain extending part way around the grooved pulley 13 on the hub 12 of the signal arm and having its terminal end secured to said pulley by a screw 23, as shown in Fig. 6, or otherwise. The conduit 22 may extend from the interior of the vehicle, through an aperture 8a in the wall of the bracket 8 and into a bore formed in a lug 8c of the bracket and aligned with the groove of the pulley 13, the outer end of said conduit being clamped against displacement by a set-screw 8b. By this arrangement a pull upon the chain will rotate the signal arm to a signaling position and upon release thereof said signal arm will be returned to its normal position against the stop 18 by the spring 15. It will be stated however, that if desired the return spring may be eliminated and gravity alone depended upon for a proper return of the signal arm.

The operating device B includes a bracket 24 adapted to be secured to the instrument-board 1 or other desired portion of the vehicle, and said bracket has a bore 24a to receive the inner end of the guide conduit 22 and is provided with a set-screw 25 clamping said conduit rigidly in place, as shown in Fig. 4. This bracket 24 also has a quadrant latch-plate 26 and pivoted at 27 is an operating lever 28 extending upwardly to align with the inner end of the conduit 22 and provided with a bore 28a to receive the inner end of the operating chain 21, said chain being clamped in place by a set-screw 29. The operating lever has an extension 28b providing a handle 28c at its outer end and carries a latch 30 which is pivoted at 31 and provides a finger piece 30a extending upwardly adjacent the handle 28c, the forward end of said latch being provided with a latch tooth 30b adapted to engage in one of four notches 32, 33, 34 and 35 formed in the periphery of the quadrant latch-plate 26. A spring 36 disposed between the operating handle 28c and the finger piece 30a tends to urge the latch into engagement with said notches of the latch-plate.

When this operating device B is in normal position the operating lever and its latch are in the position shown, with the latch tooth 30b engaged within the first notch 32 and the signal arm A is in its non-indicating position against the stop 18, as shown in full lines in Fig. 2. When it is desired to signal for a contemplated stop the latch 30 is withdrawn from the notch 32 and the operating handle 28c is drawn downwardly to align the latch tooth 30b with the second notch 33, the latch meanwhile having been released so as to automatically snap into said second notch. This operation exerts a proper pull upon the operating chain 21 to rotate the signal arm to a stop signaling position, as indicated by the dotted lines S in Fig. 2.

In a like manner the latch may be released and the operating lever drawn downwardly to align the latch tooth 30b with the third notch 34, thus rotating the signal arm A to a horizontal position, as indicated by the dotted lines L in Fig. 2, to signal a contemplated left turn, or to align said latch tooth 30b with the fourth notch 35, thus rotating the signal arm A to a more or less upward position, as indicated by the dotted lines R in Fig. 2, thus to signal a contemplated right turn. It will of course be understood that in the movements of the operating lever downwardly or upwardly from one position to the various other positions the latch will preferably be held retracted while its tooth 30b is passing the intermediate notches.

The arrangement above described provides a manual means for setting the signal arm to the various signaling positions and for maintaining the signal arm in set position until the retaining latch is released and the operating lever returned to its normal position with the latch engaging within the first notch 32 of the latch plate.

It being desirable to cause a setting of the signal arm to stop signaling position when the vehicle brake is applied and while the manual operating device B is in normal condition, we provide the automatic power means C for moving the signal arm A to the stop signaling position independently of the device B and the operating chain 21, the means C being operatively associated with the brake mechanism of the vehicle.

In the arrangement now being described this power means comprises a solenoid coil 37 mounted in a housing 38 preferably forming a part of or secured to the supporting bracket 8, and a core 39 provided with an operating finger 40 of reduced diameter and preferably of non-magnetic material, such as brass. This operating finger 40 extends through an aperture in the front wall 41 of the housing 38 in position to engage and operate the signal arm A, said front wall 41 forming a stop for the core 39 thus limiting the propelling stroke of said core and its operating finger 40 and determining the stop signaling position of the signal arm. The aperture in the wall 41 is somewhat larger than the finger 40 and the rear wall of said housing has an air vent opening 42 so that the armature will function freely and not become air bound.

To provide for the required electrical circuits for energizing the signal illuminating lamp 6 and for operating the power device C, certain contact devices are associated with the manual operating mechanism B and with the brake mechanism of the vehicle. The contact devices associated with the device B include a contact terminal 43 carried by a head 44 formed on the outer end of the latch 30 and disposed on the opposite side of the quadrant latch plate 26, said terminal 43 extending through an insulating bushing 45 in the bore of the head 44 and being further and completely insulated from said head by washers 46 of insulating material, and maintained rigidly in place in said head by a nut 47 engaging its upper screw-threaded end. (See Fig. 5.) This latch terminal 43 is adapted to selectively engage the several contact members which are carried by a curved insulating block 48 secured to the side of the quadrant plate 26, as shown in Fig. 3.

Three of these contacts, 49, 50 and 51, are aligned with the respective notches 33, 34 and 35 and are electrically connected by a curved buss-bar 52, and each contact is of the form of a headed bolt which extends through a bore in said buss-bar, through a bore in said insulating block 48, and is secured in place by a nut engaging its screw-threaded end on the under side of said insulating block, as shown in Fig. 5. A similar contact 53 is aligned with the neutral notch 32 of the latch plate 26, however, this contact 53 is not connected electrically to the other contacts by the buss-bar 52. A spring contact 54 is carried by the insulating block 48 and projects above the stationary contact 53 so that when the latch 30 engages in the neutral notch 32 the latch terminal 43 first engages the spring contact 54 and then presses said spring contact into engagement with the stationary contact 53. As shown in Figs. 1 and 3, the insulated circuit wires leading to the several contacts of the device B all extend through an eye 55 of a support carried by the quadrant plate 26, the circuit wire leading to the contact terminal 43 having sufficient slack to allow unrestricted manipulation of the operating lever and the latch.

In the installation shown in Fig. 7, there is provided a switch D operatively associated with the mechanical brake mechanism E of the vehicle and in a preferred form this switch includes two stationary contacts 56 and 57 and a movable contact 58 which is normally urged to open position by a spring 59. The movable contact 58 may be operatively associated with any movable part of the brake mechanism so as to close the switch whenever the brakes are applied by depression of the brake pedal 60. In the arrangement illustrated an arm 61 carried by the pedal shaft is connected with the movable switch contact 58 by a connection 62 which includes a spring 63, this spring being of greater tension than the switch spring 59. When the brake pedal is depressed the switch will be closed during the first portion of the pedal movement and the spring 63 will then be stretched to maintain the movable switch contact 58 firmly in engagement with the stationary switch contacts during the remainder of the pedal depression and during a greater portion of the return movement of the pedal, that is, until the spring 63 has contracted to normal condition after which the switch spring 59 becomes effective to open the switch.

In the circuit arrangement shown in Fig. 7, the signal illuminating lamp 6 is grounded as indicated at 65 and its opposite terminal is connected by the wire 7 to the switch terminal 43 of the device B. The solenoid coil 37 is also grounded as indicated at 66 and its opposite terminal connects by wire 67 with the spring contact 54 of said device B. The three contacts 49, 50 and 51, through the buss-bar 52, are connected to a battery 68, or other suitable source of electrical energy, by means of a wire 69, the opposite terminal of said battery being grounded as indicated at 70. The contact 53 of the device B is connected by a wire 71, to the contact 56 of the brake switch D and the contact 57 of said brake switch connects by wire 72, with the battery lead 69. This system of wiring provides a primary feed circuit transmitting energy from the battery to the contact 53 through wire 72, normally open brake switch D and wire 71; a secondary feed circuit transmitting energy from the buss-bar contacts 49, 50 and 51, by wire 69, these being parallel feed circuits; a branch illuminating circuit including the terminal contact 43, wire 7 and lamp 6; and a branch power circuit including the spring contact 54, wire 67 and solenoid coil 37, the illuminating branch circuit and the power branch circuit being relatively parallel circuits.

In the normal condition of the signal device herein described, the manually operable lever is in its upper position with the latch 30 engaged in the first or neutral notch 32 of the quadrant latch plate and the signal arm A is in the depending non-signaling position shown in full lines in Fig. 2. In this neutral condition, the contact terminal 43 of the latch 30 has engaged the spring contact 54 and depressed it into contact with the stationary contact 53, as indicated in Fig. 7, and the brake switch D is in the open position shown.

Now, if for any reason the brake of the vehicle is operated the brake switch D will be closed and an energizing circuit completed from battery 68, wire 72, brake switch contacts 57, 58, 56, wire 71 to contact 53 of the device B and from contact 53 through two parallel circuits, one including contact 54, wire 67, coil 37 and ground 66 and the other including the spring contact 54, terminal contact 43, wire 7, lamp 6 and ground 65, the opposite side of the battery being grounded at 70. It will thus be evident that with the device B in neutral condition, each depression of the brake pedal or each braking operation of the brake mechanism will cause the lamp 6 to be energized and the signal arm A to be moved by the power means C to the stop signaling position indicated by the dotted lines S in Fig. 2. This movement of the signal arm A by the power means C independent of movement of the manually operable lever of the device B is possible by reason of the nature of the motion transmitting means between the device B and the signal arm A. This motion transmitting means which in the present embodiment is a link chain 21, is capable of transmitting only a pulling movement, that is a downward movement of the operating lever of the setting device B will exert a pull on the chain 21 to set the signal arm A, and a return of the signal arm by the return spring 15 and gravity or by gravity alone when said spring is not used, will exert a reverse pull on said chain, but in no instance will a pushing movement be transmitted by the chain. Therefore, when the device B is in neutral condition and the signal arm A is moved by the power means C to a stop signaling position, the rotation of the chain pulley 13 will merely slacken the chain 21 and cause it to drop down in the pulley chamber 11, in the manner shown in Fig. 6. Thus the chain, particularly that portion which connects with the signal arm pulley, provides a lost-motion connection between the signal arm and the manual setting device B. It will of course be understood that the closing stroke of the brake switch D may be varied to cause this switch to close later or earlier in the brake applying operation.

If it is desired to set the signal to indicate a contemplated stop, the manual lever 28 is adjusted to engage the latch 30 with the second notch 33 thus releasing the terminal contact 43 from its normal engagement with the spring contact 54 which also releases the spring contact 54 from engagement with the contact 53, and engaging the terminal contact 43 with the contact 49 of the buss-bar 52, as shown in Fig. 3. This movement of the lever 28 exerts a pull on the chain 21 to position the signal arm A to the stop signaling position indicated by the dotted lines S in Fig. 2 and with the mechanism in this position the circuit to the solenoid 37 as well as the circuit through the brake switch D, will be broken at the spring contact 54. The circuit to energize the signal lamp 6 will be completed from the battery 68 through wire 69, contact 50, buss-bar 52, contact 49, terminal contact 43, wire 7, lamp 6 to ground 65, the opposite side of the battery being grounded at 70, as before. The setting of the signal arm to the other signaling positions to indicate a contemplated left turn or a contemplated right turn will cause a similar energizing of the lamp circuit due to the buss-bar connection of the three contacts 49, 50 and 51, the longer movement of the setting lever to these positions merely exerting a longer pull on the motion transmitting chain to further rotate the signal arm.

In Fig. 8 there is illustrated a modified arrangement in which the solenoid is replaced by a pressure means associated with an air or hydraulic vehicle brake system. In this arrangement pressure is supplied by a master cylinder 75 and transmitted by a suitable conduit 76 to a brake cylinder 77 associated with the wheel brake, it of course being understood that in the complete practical installation there will be two or more of such brake cylinders associated with the respective wheels of the vehicle, all connected with the pressure conduit system in any well known or preferred manner. A branch conduit 78 transmits pressure from the brake system to a pressure power means C¹ comprising a pressure cylinder having a spring normalized piston and a plunger 79 arranged to operate the signal arm in the same manner as the solenoid heretofore described. A branch conduit 80 transmits pressure from the brake system to a pressure device 81 comprising a cylinder having a spring normalized piston and a plunger 82 carrying the movable contact 58 of the brake switch D, said contact being preferably insulated from said plunger. It should be quite evident that since the solenoid is not used in this modified arrangement, the spring contact 54 and circuit wire 67 of the first described arrangement will be eliminated.

Fig. 8 shows the mechanism in neutral condition with the terminal contact 43 engaging the contact 53 and with the mechanism so arranged it will be understood that operation of the master brake cylinder to apply braking pressure to the brake system will cause operation of the power means C¹ to move the signal arm A to stop signaling position while the pressure device 81 will close the brake switch D to complete a circuit to the signal lamp 6 from the battery 68 through wire 72, switch contacts 57, 58, 56, wire 71, contact 53, terminal contact 43, wire 7, lamp 6 to ground 65, the opposite side of the battery being grounded at 70. The setting of the signal arm A to the various signal setting positions will in this arrangement be accomplished exactly as previously explained in connection with Fig. 7 and the signal lamp circuits energized in the same manner through the three buss-bar connected contacts 49, 50 and 51.

In instances where a vehicle is provided with both mechanical and fluid pressure brakes, a pressure device similar to and operated in the same manner as the pressure device 81, may be added to the arrangement shown in Fig. 7, so that the brake switch would then be closed when either of the brakes were applied.

In Fig. 9 there is illustrated a mechanical form of power means associated with the brake mechanism and functioning automatically upon application of the brake to move the signal arm to stop signaling position. Such power means comprises a lever 85 adapted to engage and move the signal arm A to stop position, said lever being rocked by a pull member 86 which connects with the movable rod of the brake switch D. It will of course be evident that the lever 85 may be connected with and operated by any other form of mechanical connection between said lever and any moving part of the brake mechanism.

The drawings illustrating this invention, in connection with the above description of the preferred construction and mode of operation, will render it apparent to those skilled in this art that we have thus provided a direction and stop signal for vehicles, in which a signal member may be selectively moved by manually operated means to signaling positions and illuminated when in signaling position, combined with an automatic power means associated with the brake system of the vehicle and adapted to function with an application of the brakes to set the signal member to the stop signaling position while the manual setting means is retained in neutral position, and while the form of embodiment herein illustrated and described is fully capable of fulfilling all of the objects primarily stated it is to be understood that we do not wish to limit the invention in this regard for it is susceptible of embodiment in various other forms all coming within the scope of the claims which follow:

We claim as our invention:

1. In a direction signal for a vehicle having a brake system, the combination of: a signal member; selective operating means adapted to be moved to different signal setting positions; a guide conduit intermediate said signal member and said selective means; a flexible pull member in said conduit operatively associated with said signal member and said selective means, whereby said signal member may be moved to a stop signaling position or to various direction signaling positions upon the selective operation of said selective means; and co-operating with said brake system and said signal member and a second operating means for automatically moving said signal member to said stop signalling position while said first operating means is at rest, said pull member being of a contractile character permitting said automatic operation of the signal member while said selective operating means remains in normal position.

2. In a direction signal adapted for installation on a vehicle having a brake system, the combination of: a pivoted signal arm movable outwardly from a neutral position to a stop signaling position and to different direction signaling positions beyond said stop signaling position; a first operating means for selectively moving said signal arm to said signaling positions; and a second operating means positioned to engage said signal arm and operable by the brake system to propel said signal arm from neutral position to said stop signaling position when the brakes are applied.

3. In a direction signal adapted for installation on a vehicle having a brake system, the combination of: a pivoted signal arm movable in one direction from a neutral position to a stop signaling position and to different direction signaling positions beyond said stop signaling position; a first operating means for selectively moving said signal arm to said signaling positions; and a second operating means positioned to engage said signal arm and operable by the brake system to move said signal arm from neutral position to said stop signaling position when the brakes are applied, said second operating means being disposed out of the path of movement of said signal arm between said stop signaling and said direction signaling positions so as to permit said signal arm to be moved from said stop signaling position to said directon signaling positions while the brakes are applied and said second operating means is in operated position.

4. A combination as defined in claim 3 in which a latch device is associated with and adapted to maintain the selective means in neutral or in one of its set positions and in which the selective means includes a lost-motion connection with the signal arm permitting operation of said signal arm by the brake-operated means while said selective means is latched in neutral position.

5. A combination as defined in claim 2, associated with means for illuminating the signal; and means for energizing said illuminating means, said energizing means comprising a primary feed circuit including a source of electric energy and a normally open switch adapted to be closed by a braking operation of said brake system; a secondary feed circuit leading from said electrical source; a branch lighting circuit including said illuminating means, and means associated with said selective means for connecting said branch lighting circuit to said primary feed circuit when said selective means is in neutral position and for connecting said branch circuit with said secondary feed circuit when said selective means is moved to any one of its selected positions.

6. A combination as defined in claim 2, in which the second operating means comprises an electric power means and means for energizing said power means, said energizing means comprising a feed circuit including a source of electric energy and a normally open switch adapted to be closed by a braking operation of said brake system, a branch power circuit including said electric power means, and means associated with said selective means for connecting said branch power circuit to said feed circuit when said selective means is in neutral position and for disconnecting said branch power circuit from said feed circuit when said selective means is moved to any one of its selective positions.

7. A combination as defined in claim 2, in which the second operating means comprises an electric power means; means for illuminating the signal and for energizing said power means, said last named means comprising a primary feed circuit including a source of electric energy and a normally open switch adapted to be closed by a braking operation of said brake system, a secondary feed circuit leading from said electrical source, a branch lighting circuit including said electric power means, and means associated with said selective means for connecting both branch circuits to said primary feed circuit when said selective means is in neutral position and for connecting only said branch lighting circuit to said secondary feed circuit when said selective means is moved to any one of its selective positions.

8. A combination as defined in claim 2, associated with a lamp for said signal arm; a latch device for said selective means; and electric control means associated with said latch device and said selective means and arranged to establish an energizing circuit to said lamp whenever said selective means is latched in one of its signal setting positions and to establish a partial circuit to said lamp whenever said selective means is latched in neutral position, said partial circuit being completed through a switch closed by a brake applying operation of the brake system.

SEELY McCORD TERWILLIGER.
WILLIAM TELL SEVENER.